(12) United States Patent
Flens et al.

(10) Patent No.: US 10,594,402 B2
(45) Date of Patent: Mar. 17, 2020

(54) OPTICALLY ENABLED MULTI-CHIP MODULES INCLUDING OPTICAL ENGINE MACROS

(71) Applicant: FINISAR CORPORATION, Sunnyvale, CA (US)

(72) Inventors: Frank J. Flens, Campbell, CA (US); Daniel Mahgerefteh, Los Angeles, CA (US); The' Linh Nguyen, San Jose, CA (US); Jimmy Alan Tatum, Plano, TX (US)

(73) Assignee: Finisar Corporation, Sunnyvale, CA (US)

( * ) Notice: Subject to any disclaimer, the term of this patent is extended or adjusted under 35 U.S.C. 154(b) by 294 days.

(21) Appl. No.: 15/369,770

(22) Filed: Dec. 5, 2016

(65) Prior Publication Data
US 2017/0237496 A1    Aug. 17, 2017

Related U.S. Application Data

(63) Continuation of application No. 14/500,212, filed on Sep. 29, 2014, now Pat. No. 9,515,746.

(60) Provisional application No. 61/883,964, filed on Sep. 27, 2013.

(51) Int. Cl.
*H04B 10/40*     (2013.01)
*H04B 10/80*     (2013.01)
*H04B 10/50*     (2013.01)

(52) U.S. Cl.
CPC ........... *H04B 10/40* (2013.01); *H04B 10/502* (2013.01); *H04B 10/801* (2013.01)

(58) Field of Classification Search
CPC ..... H04B 10/40; H04B 10/502; H04B 10/801
See application file for complete search history.

(56) References Cited

U.S. PATENT DOCUMENTS

| | | | | |
|---|---|---|---|---|
| 8,873,966 | B1 * | 10/2014 | Wach | H04B 10/40 398/138 |
| 2001/0048793 | A1 * | 12/2001 | Dair | G02B 6/4214 385/92 |
| 2003/0095756 | A1 * | 5/2003 | Tohgoh | G02B 6/4214 385/88 |
| 2014/0270778 | A1 * | 9/2014 | Hui | H04B 10/40 398/79 |

\* cited by examiner

*Primary Examiner* — Tony Ko
(74) *Attorney, Agent, or Firm* — Maschoff Brennan

(57) ABSTRACT

An optically enabled multi-chip module has an optical engine transceiver and a host system chip. The optical engine transceiver has an optical engine front-end and an optical engine macro. The optical engine front-end has multiple laser diodes, laser driver circuitry electrically interfaced with each of the laser diodes, multiple photodiodes, amplifier circuitry electrically interfaced with each of the photodiodes, and at least one optical element optically positioned between the laser diodes and at least one optical fiber and between the photodiodes and the at least one optical fiber. The at least one optical element optically interfaces the laser diodes and photodiodes with the optical fiber. The optical engine macro is both electrically interfaced with and physically segregated from the optical engine front-end. The optical engine macro provides a subset of optical transceiver functionality to the optical engine front-end. The host system chip is electrically interfaced with the optical engine transceiver.

20 Claims, 6 Drawing Sheets

OPTICALLY ENABLED MULTI-CHIP MODULES INCLUDING OPTICAL ENGINE MACROS

CROSS-REFERENCE TO RELATED APPLICATIONS

This patent application is a continuation of U.S. patent application Ser. No. 14/500,212, filed on Sep. 29, 2014 titled; "OPTICALLY ENABLED MULTI-CHIP MODULES" which claims the benefit of and priority to U.S. Provisional Application No. 61/883,964, filed on Sep. 27, 2013, titled: "OPTICALLY ENABLED MULTI-CHIP MODULE HAVING WAVELENGTH AND SPACE DIVISION MULTIPLEXED TRANSCEIVERS," which are incorporated herein by reference in their entireties.

FIELD

The embodiments discussed herein relate generally to multi-chip modules. More particularly, example embodiments relate to optically enabled multi-chip modules configured for optical communication with other optically enabled devices.

BACKGROUND

Unless otherwise indicated herein, the materials described in this section are not prior art to the claims in the present application and are not admitted to be prior art by inclusion in this section.

Multi-chip modules are used to package multiple integrated circuits, or "chips" onto a single substrate in order to decrease the distance between the chips and thereby increase communication speeds between the chips on the multi-chip module. However, most multi-chip modules also need to interface and communicate with other external devices that are further away, creating communication bottle necks between the multi-chip module and these external devices.

Communication bottle necks between the multi-chip module and external devices can be reduced by utilizing high speed optical fiber communications. However, implementing high speed optical fiber communications on multi-chip modules can involve many considerations such as thermal isolation, optical signal noise reduction, optical signal integrity, and manufacturing/testing considerations related to the optical transmitter and receiver components that will be used with the multi-chip modules.

The subject matter claimed herein is not limited to embodiments that solve any disadvantages or that operate only in environments such as those described above. Rather, this Background Section is provided to illustrate one exemplary technology area where embodiments of the present disclosure described herein may be practiced.

BRIEF DESCRIPTION OF THE DRAWINGS

The foregoing and following information, as well as other features of this disclosure, will become more fully apparent from the following description and appended claims, taken in conjunction with the accompanying drawings. Understanding that these drawings depict only typical embodiments in accordance with this disclosure, and are therefore not to be considered limiting of its scope, the disclosure will be described and explained with additional specificity and detail through use of the accompanying drawings in which:

DETAILED DESCRIPTION

Figure 1:
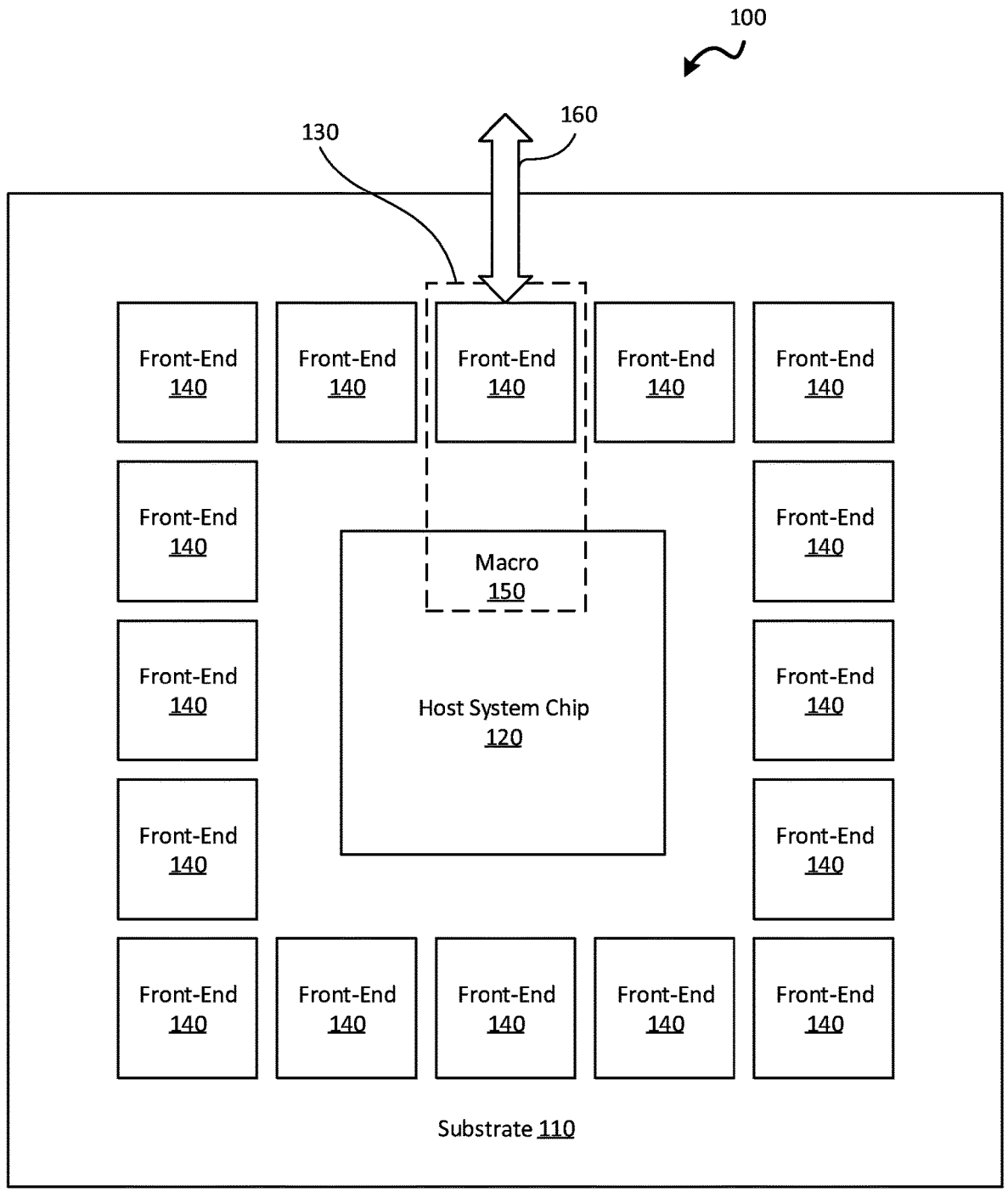
FIG. 1 shows a top view of a multi-chip module according to one embodiment of the present disclosure.

In the following detailed description, reference is made to the accompanying drawings that show, by way of illustration, exemplary embodiments of the invention. In the drawings, similar symbols typically identify similar components, unless context dictates otherwise. These embodiments are described in sufficient detail to enable those skilled in the art to practice the invention. Other embodiments may be utilized and structural, logical, and electrical changes may be made without departing from the spirit or scope of the subject matter presented herein. Moreover, it is to be understood that the various embodiments of the invention, although different, are not necessarily mutually exclusive. For example, a particular feature, structure, or characteristic described in one embodiment, in the figures, or generally described herein, may be included, arranged, substituted, combined, separated, and designed within other embodiments in a wide variety of different configurations, all of which are explicitly contemplated herein. Accordingly, it will be readily understood that the present invention, as generally described and illustrated in the figures herein, could vary in a wide range. The following detailed description is, therefore, not to be taken in a limiting sense, and the scope of the present invention is defined only by the appended claims, along with the full scope of equivalents to which such claims are entitled.

FIG. 1 shows a top view of a multi-chip module 100 embodiment in accordance with the present disclosure. A multi-chip module (MCM) is an electronic package where multiple integrated circuits, "chips," semiconductor dies, or other discrete components, are packaged together onto a unifying substrate. The MCM itself is often referred to as a "chip" because of its integrated nature and functionality. Most MCM's utilize a relatively thin and flat substrate, with the chips attached to the substrate and arranged horizontally along the substrate with respect to each other. The substrate can be made from many different materials and processes, including, but not limited to: multi-layer laminated printed circuit board, deposition utilizing thin film technology, ceramic materials such as low temperature co-fired ceramic (LTCC) and high temperature co-fired ceramic (HTCC), etc. Some MCMs can also allow chips to be arranged vertically with respect to each other. These MCMs are called "chipstack" MCMs. It is to be understood that all of the embodiments disclosed herein can be utilized with any type of MCM, MCM technology, or MCM configuration.

The multi-chip module 100 shown in FIG. 1 includes a substrate 110 and a host system chip 120 surrounded by multiple optical engine front-ends 140. The host system chip 120 can be any device or integrated circuit that sends or receives data including, but not limited to: an application-specific integrated circuit (ASIC), a complex programmable logic device (CPLD), a field-programmable gate array (FPGA), a very-large-scale integration (VLSI) system or device, a system on chip (SoC), an application-specific instruction-set processor (ASIP), an arithmetic logic unit (ALU), a floating-point unit (FPU), a digital signal processor (DSP), a processor, memory, a storage device, a bus/interface controller, a network controller, communication ports, a graphics processing unit, and the like. The host system chip 120 can include one or more optical engine macros 150 that interact with each optical engine front-end 140 and provide a subset of transmitter, receiver, and/or transceiver functionality to each optical engine front-end 140. Each optical engine front-end 140 can be physically segregated from its respective optical engine macro 150, and/or the host system chip 120, as shown in FIG. 1.

FIG. 1 illustrates one optical engine macro 150 that is associated with one of the optical engine front-ends 140. Although a single optical engine macro 150 is illustrated in FIG. 1, the host system chip 120 may include multiple optical engine macros 150, including a different optical engine macro 150 associated with each of the optical engine front-ends 140.

The optical engine macro 150 can be electrically interfaced with the optical engine front-end 140 through low loss high speed lines to form an optical engine 130. Each optical engine 130 includes at least one optical engine front-end 140 and at least one optical engine macro 150. Each optical engine 130 contains all of the hardware and/or software necessary to enable the host system chip 120 to optically communicate with other optically-enabled devices (not shown) through at least one optical fiber 160 associated with the optical engine front-end 140, as will be explained in more detail below. Likewise, each of the optical engine front-ends 140 shown in FIG. 1 can be associated with one or more optical engine macros 150 to form additional optical engines 130. Each of these additional optical engines 130 can also include one or more optical fibers 160 and allow the host system chip 120 to communicate with other optically-enabled devices. The host system chip 120 can be electrically interfaced with each additional optical engine 130 through one or more optical engine macros 150. For example, in the embodiment shown in FIG. 1 there are sixteen optical engine front-ends 140. If each optical engine 130 is associated with one or more optical engine macros 150 and the host system chip 120, then the optically enabled MCM 100 will have sixteen optical engines 130. Only one of the optical engines 130 is labeled in FIG. 1 for simplicity.

Figure 2:
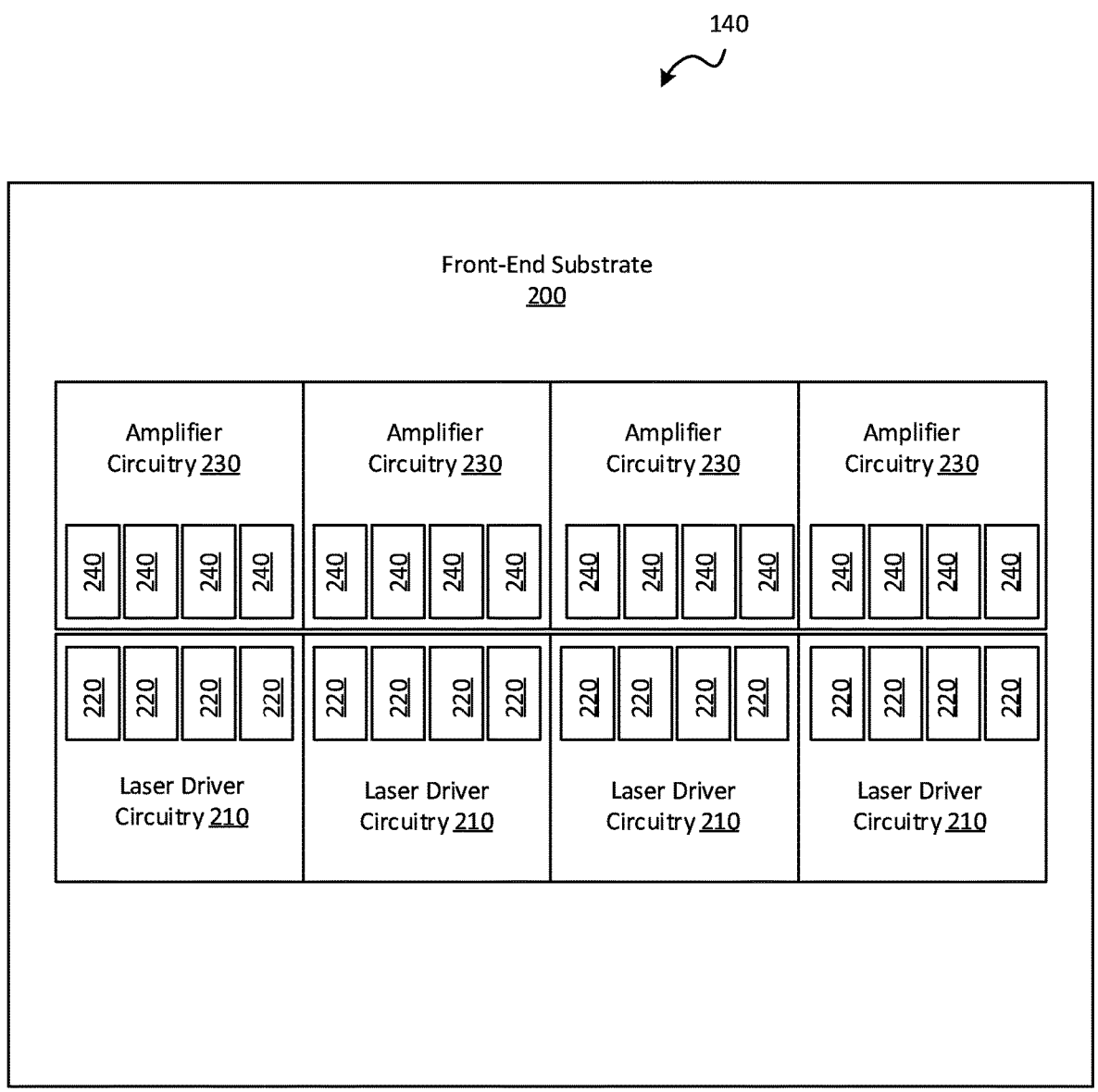
FIG. 2 shows a top view of an optical engine front-end according to one embodiment of the present disclosure.
Figure 3:
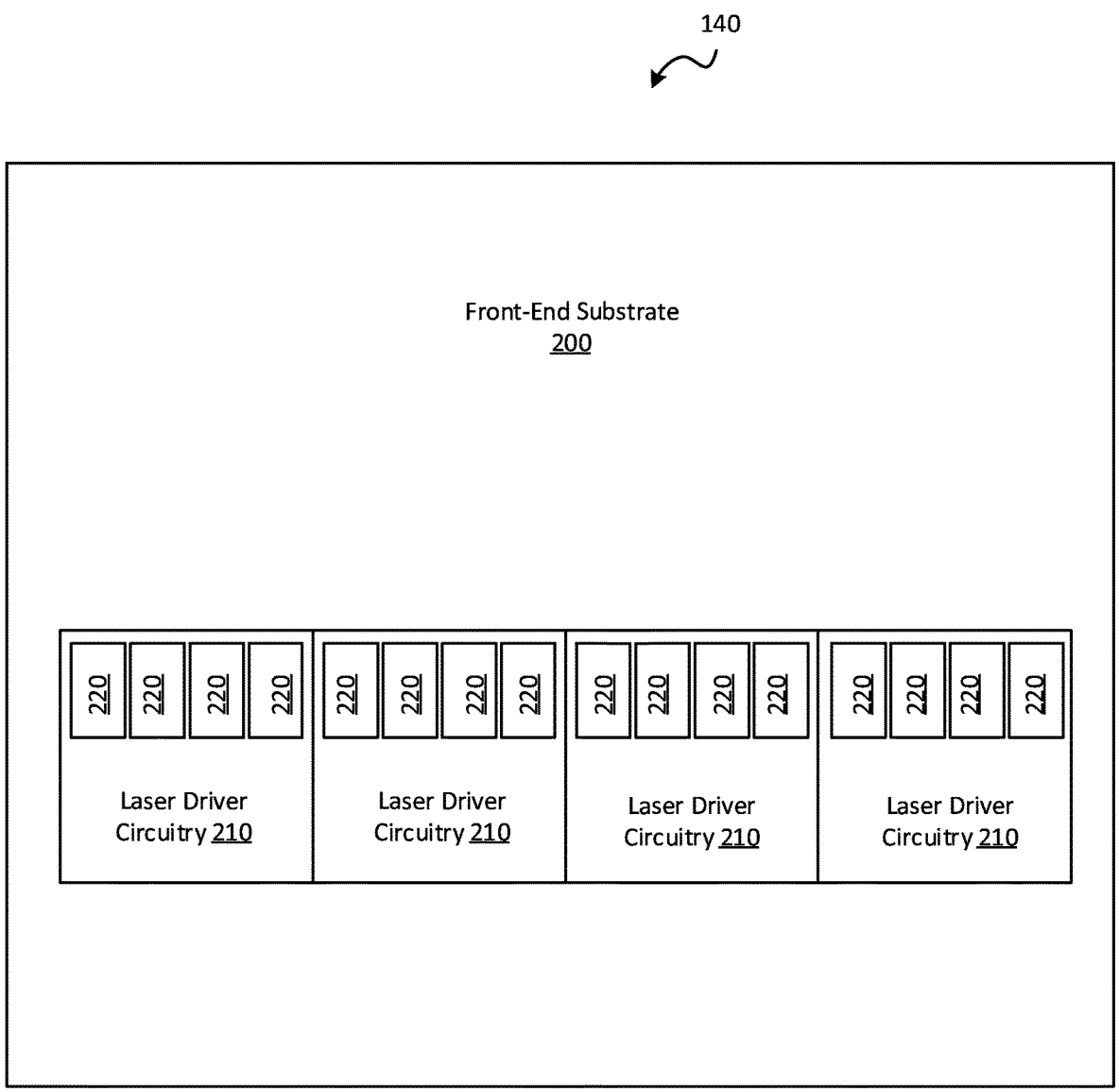
FIG. 3 shows a top view of an optical engine front-end according to another embodiment of the present disclosure.
Figure 4:
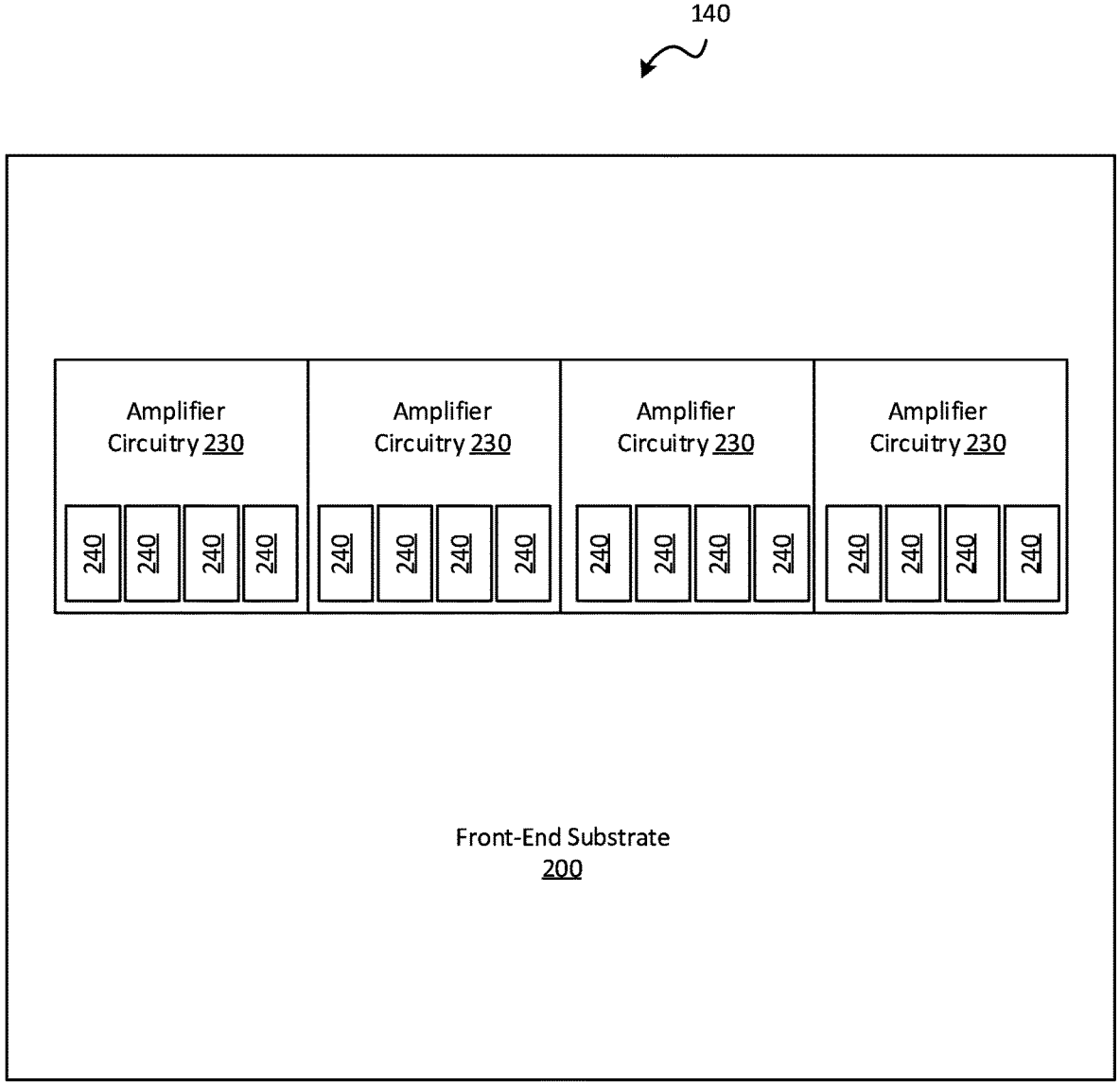
FIG. 4 shows a top view of an optical engine front-end according to yet another embodiment of the present disclosure.

Each optical engine 130 can be configured to operate as a transmitter, a receiver, or a transceiver. In this manner, each optical engine 130 can be referred to as an optical engine transmitter, an optical engine receiver, or an optical engine transceiver. Accordingly, each optical engine macro 150 and optical engine front-end 140 can vary in structure and function, depending on whether it is configured to operate as part of an optical engine transmitter, an optical engine receiver, or an optical engine transceiver. For example, FIGS. 2-4 show three different optical engine front-end 140 embodiments corresponding respectively to an optical engine transceiver, an optical engine transmitter, and an optical engine receiver.

Each optical engine macro 150 can include all of the hardware and/or software necessary to send and/or receive data to and/or from the host system chip 120. Each optical engine macro 150 can be integral with, or reside on, the host system chip 120. For example, the host system chip 120 may come preconfigured with high speed input/output data lines which have all of the hardware and software necessary to operate these input/output data lines. The host system chip 120 may also be programmed in the field to enable high speed input/output data transmission to and from the host system chip 120. Alternatively, or in addition thereto, each optical engine macro 150 can be separate from the host system chip 120. For example, some embodiments may include one or more separate chips including optical engine macros 150 that interface the host system chip 120 with each optical engine front-end 140. Alternately or additionally, laser device specific settings that can generate pulse shaping at the driver output, equalization settings, DFE or FFE, and more sophisticated digital signal processing functions that allow the laser to generate higher order modulation formats such as N level pulse amplitude modulation (PAM-N), digital multi-tone (DMT) and other formats can be included in each optical engine macro 150.

As previously indicated, each optical engine macro 150 provides a subset of optical transceiver functionality to the corresponding optical engine front-end 140. The subset of optical transceiver functionality provided by the optical engine macro 150 may include laser device specific settings that can generate pulse shaping at the driver output, equalization settings, DFE or FFE, and more sophisticated digital signal processing functions that allow the laser to generate higher order modulation formats such as N level pulse amplitude modulation (PAM-N), digital multi-tone (DMT) and other formats.

Each optical engine front-end 140 can include all of the hardware necessary to send and receive data to and from the optical engine macro 150 and to and from other optically enabled devices through at least one optical fiber 160. The at least one optical fiber 160 can include one or more single-mode fibers, one or more multi-core fibers, one or more multi-mode fibers, one or more few mode fibers, one or more bidirectional fibers, one or more bidirectional multi-mode fibers, one or more bidirectional multi-mode/multi-core fibers, or any combination thereof.

FIG. 2 shows a top view of an optical engine front-end 140 configured to send and receive optical signals as part of an optical engine transceiver 130. The optical engine front-end 140 can include a front-end substrate 200, laser driver circuitry 210, laser diodes 220, amplifier circuitry 230, and photodiodes 240.

The front-end substrate 200 can be made with any one or more of many different materials and processes, including, but not limited to: multi-layer laminated printed circuit board, deposition utilizing thin film technology, ceramic materials including LTCC and HTCC, etc. The front-end substrate 200 can be electrically interfaced with the substrate 110 of the MCM through any known technique including, but not limited to: solder, through silicon vias (TSVs), wire bonds, etc.

The laser driver circuitry 210 can be electrically interfaced with the front-end substrate 200 and laser diodes 220. In the embodiment shown in FIG. 2, the laser driver circuitry 210 can include multiple discrete simplified quad laser drivers, such as four discrete simplified quad laser drivers in the example of FIG. 2, that each interface with multiple laser diodes 220. For example, each discrete simplified quad laser driver can be electrically interfaced with four laser diodes 220. Thus, in this embodiment the optical engine front-end 140 has sixteen laser diodes 220. However, it is to be understood that any number of laser driver circuitry 210 chips and/or laser diodes 220 can be utilized.

The amplifier circuitry 230 can be electrically interfaced with the front-end substrate 200 and photodiodes 240. In the embodiment shown in FIG. 2, the amplifier circuitry 230 can include multiple discrete simplified quad preamplifiers, such as four discrete simplified quad preamplifiers in the example of FIG. 2, that each interface with multiple photodiodes 240. For example, each discrete simplified quad preamplifier can be electrically interfaced with four photodiodes 240. Thus, in this embodiment the optical engine front-end 140 has sixteen photodiodes 240. However, it is to be understood that any number of amplifier circuitry 230 chips and/or photodiodes 240 can be utilized.

The operation of the laser driver circuitry 210, laser diodes 220, amplifier circuitry 230, and photodiodes 240 will be explained in greater detail below with reference to FIGS. 5 and 6.

FIG. 3 shows a top view of an optical engine front-end 140 configured to transmit optical signals as part of an optical engine transmitter 130. The optical engine front-end 140 of FIG. 3 is similar in structure and functionality to that shown in FIG. 2, with the exception that the optical engine front-end 140 of FIG. 3 does not include the receiver components, structure, and functionality. In particular, the amplifier circuitry 230 and the photodiodes 240 of FIG. 2 are omitted in FIG. 3. Rather, the optical engine front-end 140 of FIG. 3 includes the front-end substrate 200, the laser driver circuitry 210 and the laser diodes 220. Each of these transmitter components can have similar structure, function, and characteristics to those components explained above with reference to FIG. 2, and explained below with reference to FIGS. 5 and 6.

FIG. 4 shows a top view of an optical engine front-end 140 configured to receive optical signals as part of an optical engine receiver 130. The optical engine front-end 140 of FIG. 4 is similar in structure to that of FIG. 2, with the exception that the optical engine front-end 140 of FIG. 3 does not include the transmitter components, structure, and functionality. In particular, the laser driver circuitry 210 and the laser diodes 220 of FIG. 2 are omitted in FIG. 4. Rather, the optical engine front-end 140 of FIG. 4 includes the front-end substrate 200, the amplifier circuitry 230, and the photodiodes 240. Each of these receiver components can have similar structure, function, and characteristics to those components explained above with reference to FIG. 2, and explained below with reference to FIGS. 5 and 6.

Figure 5:
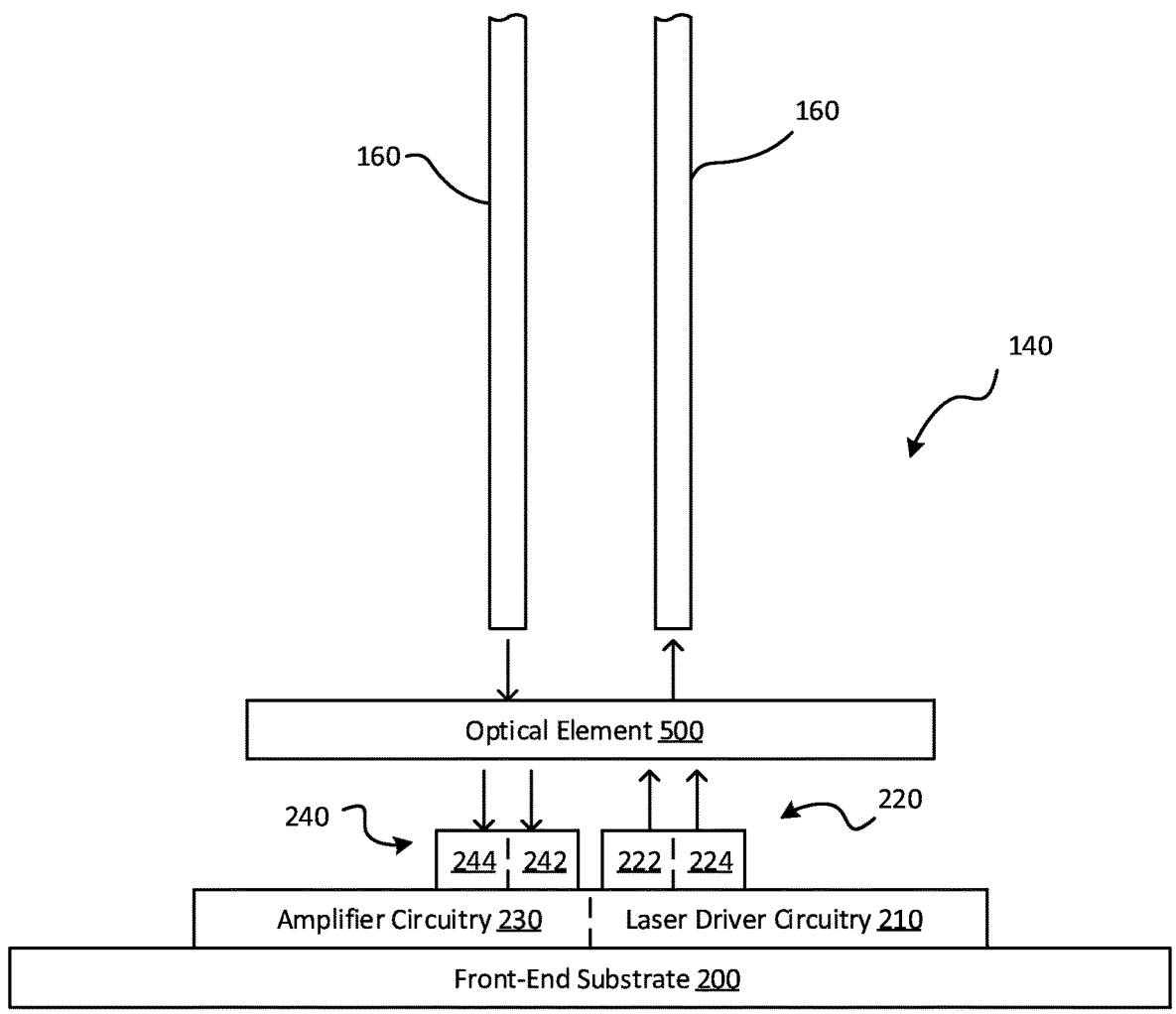
FIG. 5 shows a side view of the optical engine front-end of FIG. 2.

FIG. 5 shows a side view of the optical engine front-end 140 of FIG. 2 with an optical element 500 that optically interfaces the laser diodes 220 and photodiodes 240 with optical fibers 160. The optical engine front-end 140 of FIG. 5 includes the front-end substrate 200, the laser driver circuitry 210, the laser diodes 220, the amplifier circuitry 230, and the photodiodes 240. Each laser diode 220 can include one or more primary laser diodes 222 and one or more spare laser diodes 224. Likewise, each photodiode 240 can include one or more primary photodiodes 242 and one or more spare photodiodes 244. The operation and circuitry of the primary and spare laser diodes 222, 224 (and the primary and spare photodiodes 242, 244) will be explained in greater detail with reference to FIG. 6 below.

With continued reference to FIG. 5, the optical element 500 can be configured to multiplex multiple laser light beams from multiple laser diodes 220 into one or more optical fibers 160, as well as demultiplex multiple laser light beams received from one or more optical fibers 160 into one or more photodiodes 240. Accordingly, the optical element 500 may include an optical multiplexer (MUX), and optical demultiplexer (DEMUX), or both a MUX and a DEMUX. In these and other implementations, the optical element 500 can include one or more lenses and/or other coupling enhancement structures or characteristics to facilitate the multiplexing/demultiplexing processes. The optical element 500 can be manufactured separate from the laser diodes 220 and photodiodes 240 and then optically coupled to the laser diodes 220 and photodiodes 240. Alternatively, or in addition thereto, the optical element 500 can be integrally formed with the laser diodes 220 and photodiodes 240. For example, the optical element 500 can be integrally formed on the same semi-conductor substrate that the laser diodes 220 and photodiodes 240 are formed on. In a particular embodiment, the optical element 500 includes integral backside coupling lenses and other suitable silicon optical components. Moreover, the one or more optical fibers 160 can also be integrated with the optical element 500 or butt-coupled with the optical element 500. However, it is to be understood that an optical element 500 may not be necessary in some embodiments. In these embodiments, the one or more optical fibers 160 can be directly integrated with the laser diodes 220 and/or photodiodes 240, or butt-coupled to the laser diodes 220 and/or photodiodes 240.

The laser diodes 220 can include any type of laser diode, including Vertical-Cavity Surface-Emitting Lasers (VC-SELs). In a particular embodiment, the laser diodes 220 include back-side emitting VCSELs and the photodiodes 240 include back-side emitting photodiodes. The laser diodes 220 can be "flip-chip" mounted onto an integrated circuit, such as the laser driver circuitry 210, when implemented as back-side emitting VCSELs and/or in other embodiments. Likewise, the photodiodes 240 can be "flip-chip" mounted onto an integrated circuit, such as the amplifier circuitry 230, when implemented as back-side emitting photodiodes.

Each laser diode 220 can be further selected to emit an optical signal at a different wavelength than one or more of the other laser diodes 220. For example, referring to the embodiment shown in FIG. 2, each laser driver circuitry 210 can be electrically interfaced with four (or some other number) of laser diodes 220 that emit optical signals at different predefined wavelengths of light. Furthermore, each of the optical signals of different wavelengths of light emitted from the laser diodes 220 can be multiplexed into the same optical fiber 160 (as shown in FIG. 5) and optical signals of different wavelengths of light received from the optical fiber 160 can be demultiplexed into corresponding photodiodes 240 that detect the corresponding optical signal. This mux/demux process can be referred to as Shortwave Wavelength Division Multiplexing (SWDM). Any suitable laser light wavelength, or range of laser light wavelengths, can be utilized with embodiments herein. For example, embodiments disclosed herein can utilize wavelengths in the range of 1000 nm-1120 nm. However, this range of wavelengths is not to be construed as limiting, and any other wavelength, or range of wavelengths can be utilized with embodiments disclosed herein.

It is also understood that each VCSEL 220 can be integrated to include multiple VCSELs 220 and/or multiple spare VCELS together and each photodiode 240 can be integrated to include multiple photodiodes 240 and/or multiple spare photodiodes 244 together. In this fashion, the separation between the apertures of the VCSELS 220 and the separation between the photodiodes 240 can be reduced to facilitate multiplexing and demultiplexing operations into and out of the same optical fiber 160.

Alternatively, or in addition to SWDM, embodiments disclosed herein can also implement spatial multiplexing, or Space Division Multiplexing (SDM), to further reduce the number of optical fibers 160 needed for a given optical engine 130 configuration, and/or to implement bi-directional data transmissions through the same optical fiber 160. Space Division Multiplexing can be implemented with multi-core fiber by transmitting and receiving data in parallel on each core. Space Division Multiplexing can be also be implemented on a single multi-mode fiber by transmitting or receiving laser light with the same wavelength, but with different spatial propagation modes. Moreover, Space Division Multiplexing can be implemented through the use of optical vortices. Embodiments disclosed herein can use any combination of SWDM, SDM through multi-core fiber, SDM through multi-mode fiber utilizing different propagation modes of laser light with the same wavelength, and SDM by utilizing different optical vortices.

It is also contemplated that embodiments herein can monolithically integrate and combine laser diodes 220 and photodiodes 240 together to achieve full-duplex bi-directional transmissions through a single optical fiber 160. For example, one or more VCSELs 220 can be integrated with one or more non-resonant photodiodes 240 and an optical element 500 with anti-reflection properties can also be included to further reduce reflections in order to facilitate full-duplex bi-directional transmissions (i.e., simultaneous transmission in both directions) through a single optical fiber 160.

Figure 6:
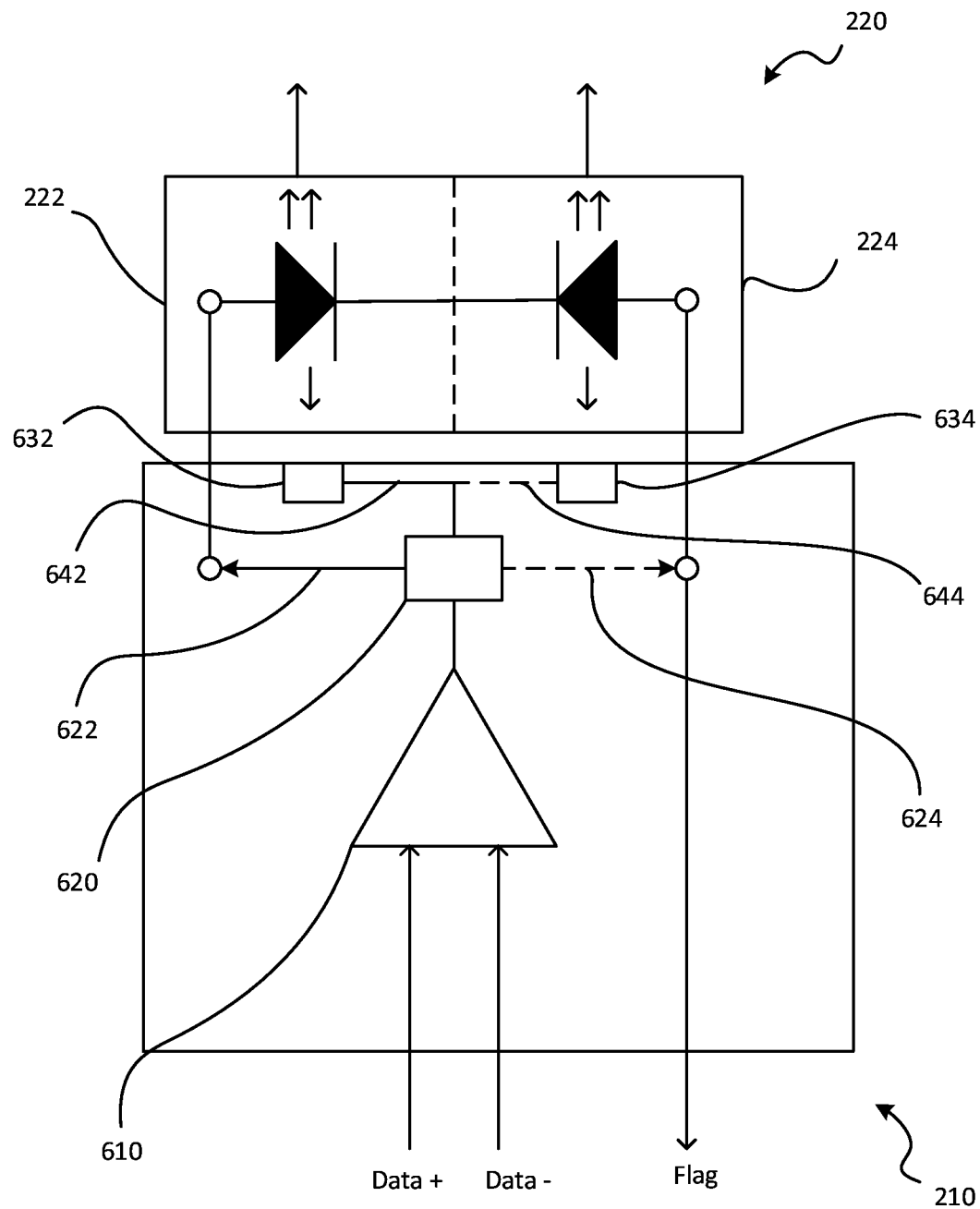
FIG. 6 shows a schematic side view of a primary laser diode, a spare laser diode and laser driver circuitry.

FIG. 6 shows an enlarged schematic side view of the primary laser diode 222, spare laser diode 224 and laser driver circuitry 210 of FIG. 5. As shown, data is provided to an amplifier 610, which can be a single amplifier, amplifier series, final stage amplifier, combiner amplifier, final multiplier amplifier, transimpedance amplifier, or any other amplifier that can provide a signal to a laser diode. The amplifier 610 can provide the amplified data signal to a switch 620. However, the switch 620 may be part of the amplifier 610 or part of an integrated circuit having the amplifier 610. The switch 620 can include a primary output data path 622 and a spare output data path 624. The primary output data path 622 can go to the primary laser diode 222 and the spare output data path 624 can go to the spare laser diode 224. The spare output data path 624 can also be split to send a flag signal to the host system chip 120, an optical engine macro 150, a flag module (not shown), or any other device. The flag signal can indicate that a failure of the primary laser diode 222 has been detected and the switch 620 has selected the spare laser diode 224 to transmit the data signal. The primary laser diode 222 can be optically coupled to a primary monitor photodiode 632, and the spare laser diode 224 can be optically coupled to a spare monitor photodiode 634. The primary monitor photodiode 632 can be connected to the switch 620 through a primary monitor data path 642 (shown as a solid line), and the spare monitor photodiode 634 can be connected to the switch 620 through a spare monitor data path 644 (shown as a dashed line). During normal operation of the laser diode 220, the primary laser diode 222 emits laser light, and the primary monitor photodiode 632 receives some of that laser light and provides a signal through the primary monitor data path 642 to the switch 620 and the switch 620 continues providing the data signal to the primary laser diode 222. When the primary laser diode 222 fails and ceases to emit laser light properly, the primary monitor photodiode 632 does not receive light properly and the signal to the switch 620 is changed or terminated. Once the switch 620 receives the changed signal, or no signal, it switches the data path to the spare output data path 624 to output the data signal to the spare laser diode 224. The spare laser diode 224 emits the laser light and the spare monitor photodiode 634 can provide a signal to the switch 620 through the spare monitor data path 644 and the data can continue to flow through the spare output data path 624 to the spare laser diode 224. When the data signal is switched to the spare output data path 624, a flag signal can also be generated to alert the host system chip 120 (or other device) that the primary laser diode 222 has failed and the spare laser diode 224 is providing the laser light.

Similarly, the primary photodiode 242, spare photodiode 244 and amplifier circuitry 230 shown in FIG. 5 can have analogous "sparing" circuitry to that shown in FIG. 6. For example, the amplifier circuitry 230 can include monitoring circuitry to monitor the primary photodiode 242 and detect when the primary photodiode 242 fails and use a switch to select the spare photodiode 244 to receive optical signals. Likewise, the amplifier circuitry 230 can also include circuitry that sends a flag signal to the host system chip 120, the optical engine macro 150, a flag module (not shown), or any other device, to indicate that a failure of the primary photodiode 242 has been detected and the switch has selected the spare photodiode 244 to receive data signals.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting. Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optically enabled multi-chip module comprising: an optical engine front-end including at least one optical element, the optical element positioned:

between a laser diode and at least one optical fiber to optically interface the laser diode with the optical fiber; or between a photodiode and the optical fiber to optically interface the photodiode with the optical fiber; and an optical engine macro that is both electrically interfaced with and physically segregated from the optical engine front-end, wherein the optical engine macro provides a subset of optical transmitter or receiver functionality to the optical engine front-end.

2. The optically enabled multi-chip module according to claim 1, wherein the optical engine macro comprises at least one host system chip.

3. The optically enabled multi-chip module according to claim 1, wherein the optical engine macro comprises one or more chips that interface with at least one host system chip.

4. The optically enabled multi-chip module according to claim 1, wherein the optical engine macro is electrically interfaced with the optical engine front-end through electrical lines to form an optical engine comprising the optical engine front-end and the optical engine macro.

5. The optically enabled multi-chip module according to claim 1, wherein the optical fiber comprises at least one multi-core fiber, at least one multi-mode fiber, or at least one bidirectional multi-mode fiber.

6. The optically enabled multi-chip module according to claim 1, wherein the laser diode comprises a back-side emitting VCSEL or the photodiode comprises a back-side receiving photodiode.

7. An optically enabled multi-chip module comprising:
   an optical engine front-end comprising:
      a plurality of laser diodes; and
      at least one optical element optically positioned between the plurality of laser diodes and at least one optical fiber, wherein the at least one optical element optically interfaces the plurality of laser diodes with the at least one optical fiber; and
   an optical engine macro that is both electrically interfaced with and physically segregated from the optical engine front-end, wherein the optical engine macro provides a subset of optical transmitter functionality to the optical engine front-end; and
   at least one host system chip electrically interfaced with at least one optical engine transmitter.

8. The optically enabled multi-chip module according to claim 7, wherein the plurality of laser diodes comprise a plurality of VCSELs.

9. The optically enabled multi-chip module according to claim 8, wherein the plurality of VCSELs comprise a plurality of back-side emitting VCSELs and the plurality of back-side emitting VCSELs are flip-chip mounted onto at least one integrated circuit that includes laser driver circuitry.

10. The optically enabled multi-chip module according to claim 9, wherein the plurality of back-side emitting VCSELs are further configured to emit optical signals having a plurality of predefined wavelengths, and the at least one optical element is further configured to multiplex the optical signals emitted from the plurality of back-side emitting VCSELs into the at least one optical fiber.

11. The optically enabled multi-chip module according to claim 7, wherein each laser diode includes a primary laser diode and a spare laser diode, wherein the spare laser diode is configured to selectively emit a corresponding one of the optical signals in the event of a primary laser diode failure.

12. The optically enabled multi-chip module according to claim 7, wherein the at least one optical fiber comprises at least one multi-core fiber.

13. The optically enabled multi-chip module according to claim 7, wherein the optical engine macro comprises at least one host system chip.

14. The optically enabled multi-chip module according to claim 7, wherein the optical engine macro comprises one or more chips that interface with at least one host system chip.

15. An optically enabled multi-chip module comprising:
   an optical engine front-end comprising:
      a plurality of photodiodes; and
      at least one optical element optically positioned between the plurality of photodiodes and at least one optical fiber, wherein the at least one optical element optically interfaces the plurality of photodiodes with the at least one optical fiber; and
   an optical engine macro that is both electrically interfaced with and physically segregated from the optical engine front-end, wherein the optical engine macro provides a subset of optical receiver functionality to the optical engine front-end.

16. The optically enabled multi-chip module according to claim 15, wherein the plurality of photodiodes comprise a plurality of back-side receiving photodiodes and the plurality of back-side receiving photodiodes are flip-chip mounted onto at least one integrated circuit that includes amplifier circuitry.

17. The optically enabled multi-chip module according to claim 16, wherein the plurality of back-side receiving photodiodes are further configured to receive optical signals having a plurality of predefined wavelengths and the at least one optical element is further configured to de-multiplex the optical signals from the at least one optical fiber into the plurality of back-side receiving photodiodes.

18. The optically enabled multi-chip module according to claim 15, wherein each photodiode includes a primary photodiode and a spare photodiode, wherein the spare photodiode is configured to selectively receive a corresponding one of the optical signals in the event of a primary photodiode failure.

19. The optically enabled multi-chip module according to claim 15, wherein the optical engine macro comprises at least one host system chip.

20. The optically enabled multi-chip module according to claim 15, wherein the optical engine macro comprises one or more chips that interface with at least one host system chip.

* * * * *